US012754872B2

(12) United States Patent
Cheng

(10) Patent No.: US 12,754,872 B2
(45) Date of Patent: Oct. 6, 2026

(54) PERIPHERAL DEVICE, DATA TRANSMISSION METHOD, AND CONTROL SYSTEM

(71) Applicant: Nuvoton Technology Corporation, Hsinchu Science Park (TW)

(72) Inventor: Sung-Pin Cheng, Hsinchu City (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 5 days.

(21) Appl. No.: 18/899,938

(22) Filed: Sep. 27, 2024

(65) Prior Publication Data

US 2025/0110915 A1 Apr. 3, 2025

(30) Foreign Application Priority Data

Sep. 28, 2023 (TW) ................................ 112137273

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ......... G06F 13/4282; G06F 2213/0042; G06F 13/382
See application file for complete search history.

(56) References Cited

U.S. PATENT DOCUMENTS

2008/0168188 A1* 7/2008 Yue ......................... G06F 9/445 710/72
2011/0196904 A1 8/2011 Kishikaiva et al.
2018/0349297 A1* 12/2018 Wilson .................. G06F 13/107
2020/0334169 A1 10/2020 Zhang et al.

FOREIGN PATENT DOCUMENTS

CN 101441634 A 5/2009
TW 201104470 A 2/2011
TW 201329712 A 7/2013

* cited by examiner

*Primary Examiner* — Zachary K Huson
(74) *Attorney, Agent, or Firm* — MUNCY, GEISSLER, OLDS & LOWE, P.C.

(57) ABSTRACT

A peripheral device including a universal serial bus (USB) interface, a storage circuit, and a command parser is provided. The USB interface is configured to be coupled to an external host and to receive file data from the external host. The file data includes a self-defining command and update data. The storage circuit is configured to store a file allocation table and a root directory. The command parser analyzes the self-defining command to generate an analysis result and operates according to the analysis result. In response to the self-defining command being an update command, the command parser performs an update operation.

19 Claims, 5 Drawing Sheets

PERIPHERAL DEVICE, DATA TRANSMISSION METHOD, AND CONTROL SYSTEM

CROSS REFERENCE TO RELATED APPLICATIONS

This application claims priority of Taiwan Patent Application No. 112137273, filed on Sep. 28, 2023, the entirety of which is incorporated by reference herein.

BACKGROUND OF THE INVENTION

Field of the Invention

The present invention relates to a peripheral device, and, in particular, to a peripheral device that comprises a universal serial bus (USB) interface.

Description of the Related Art

When a host device wants to set the parameters of a peripheral device or wants a peripheral device to perform a specific operation (such as to update program code), the host device needs to install a specific tool, and then opens that specific tool to set the peripheral device. However, different peripheral devices may correspond to different specific tools, resulting in the host device needing to install multiple specific tools.

BRIEF SUMMARY OF THE INVENTION

In accordance with an embodiment of the disclosure, a peripheral device comprises a universal serial bus (USB) interface, a storage circuit, and a command parser. The USB interface is configured to be coupled to an external host and to receive file data from the external host. The file data comprises a self-defining command and update data. The storage circuit is configured to store a file allocation table and a root directory. The command parser analyzes the self-defining command to generate an analysis result and operates according to the analysis result. In response to the self-defining command being an update command, the command parser performs an update operation.

An exemplary embodiment of a data transmission method is described in the following paragraph. A determination is made as to whether a peripheral device is coupled to an external host. In response to the peripheral device being coupled to the external host, the peripheral device simulates as a virtual disk. Update-file data is output to the peripheral device to update specific information of the peripheral device. The update-file data comprises file-location data and data content. The data content comprises a self-defining command and update data.

In accordance with another embodiment of the disclosure, a control system comprises an external host and a peripheral device. The external host comprises first USB interface. The first USB interface is configured to output file data. The peripheral device comprises a second USB interface, a storage circuit, and a command parser. The second USB interface is configured to receive the file data which comprises a self-defining command and update data. The storage circuit is configured to store a file allocation table and a root directory. The command parser analyzes the self-defining command to generate an analysis result and operates according to the analysis result. In response to the self-defining command being an update command, the command parser performs an update operation.

Data transmission methods may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes an external host and a peripheral device for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
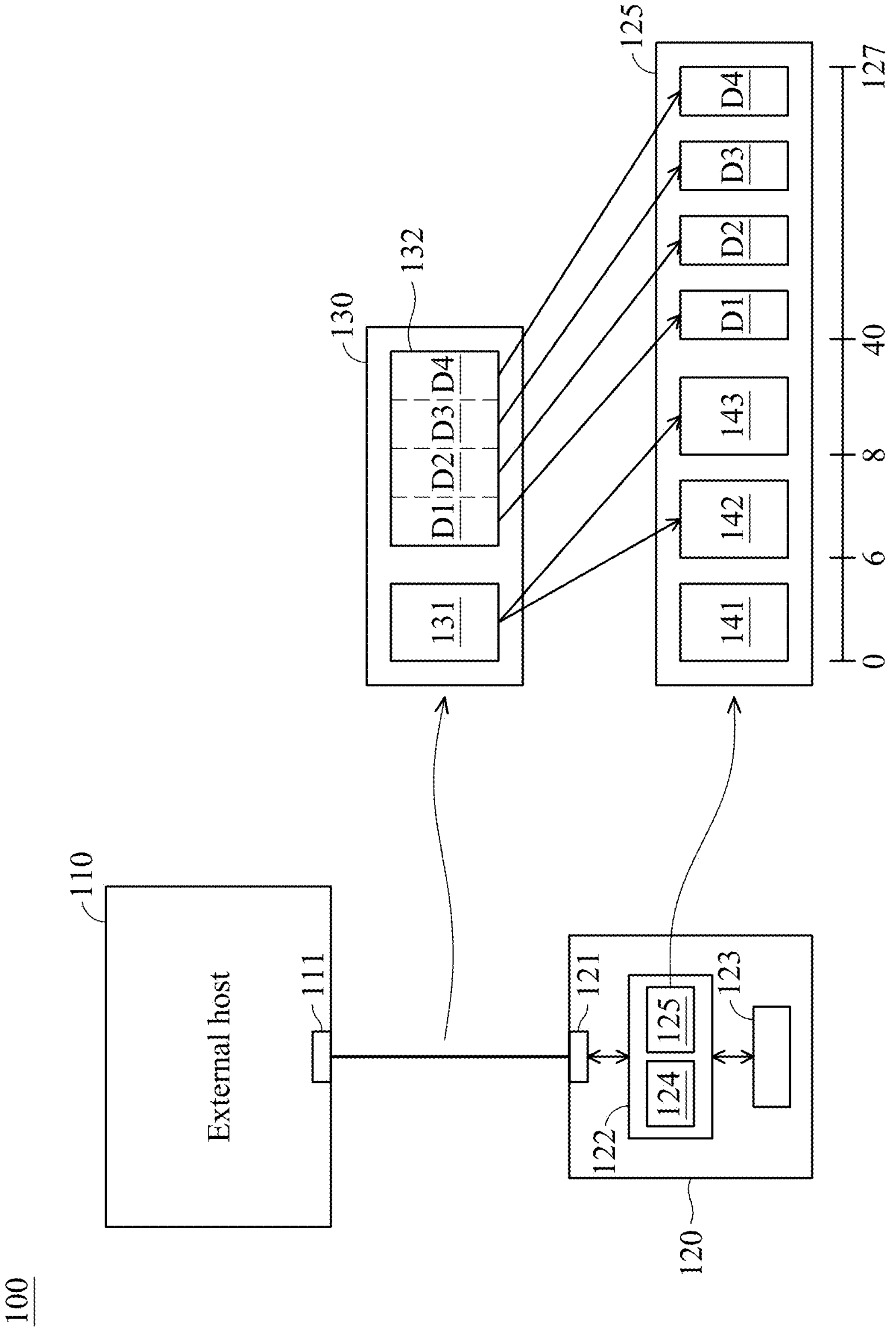
FIG. 1 is a schematic diagram of an exemplary embodiment of a control system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of a control system according to various aspects of the present disclosure. The control system 100 comprises an external host 110 and a peripheral device 120. When the peripheral device 120 is coupled to the external host 110, the peripheral device 120 simulates as a virtual disk. Therefore, for the external host 110, the peripheral device 120 is a general disk drive. The external host 110 may directly write the update data to the peripheral device 120, or directly read the settings of the peripheral device 120 without opening any additional tools.

Taking the Microsoft operating system Windows as an example, when the peripheral device 120 is coupled to the external host 110, the peripheral device 120 simulates as a disk G. The user may use a mouse to drag the file content 132 to the peripheral device 120. Therefore, the external host 110 outputs the file data 130 to the peripheral device 120. In this embodiment, the external host 110 generates the file data 130 according to the characteristics of a file allocation table (FAT).

In one embodiment, the file data 130 comprises file-location data 131 and file content 132. In some embodiments, the file content 132 comprises a self-defining command and data. The peripheral device 120 analyzes the self-defining command to generate an analysis result and performs a specific operation according to the analysis result. For example, the peripheral device 120 may store the data or use the data to update internal data (e.g., time information) according to the analysis result.

The structure of external host 110 is not limited in the present disclosure. In one embodiment, the external host 110 is a personal computer (PC) or a laptop computer. In some embodiments, the external host 10 comprises a transmission interface 111. The transmission interface 111 is configured to be coupled to the peripheral device 120. The kind of transmission interface 111 is not limited in the present disclosure. In one embodiment, the transmission interface 111 is a universal serial bus (USB) interface.

In this embodiment, the peripheral device 120 comprises a transmission interface 121. The transmission interface 121 is configured to receive the file data 130. The kind of transmission interface 121 is not limited in the present disclosure. The kind of transmission interface 121 may be the same as the kind of transmission interface 111. In one embodiment, the transmission interface 121 is a USB interface.

In other embodiments, the peripheral device 120 further comprises a command parser 123. The command parser 123 analyzes the self-defining command of the file content 132 to generate an analysis result and operates according to the analysis result. For example, when the self-defining command of the file content 132 is an update command, it means that the external host 110 wants to update the settings of the peripheral device 120. Therefore, the command parser 123 performs an update operation.

In one embodiment, when the self-defining command of the file content 132 is an update command, the command parser 123 utilizes the data of the file content 132 to update time information. For example, the peripheral device 120 may comprise a real time clock (RTC). The command parser 123 utilizes the data of the file content 132 to correct the time information of the RTC (not shown). In this case, the peripheral device 120 does not retain the file content 132. Therefore, when the peripheral device 120 is powered on again, the peripheral device 120 does not have the file content 132. In this embodiment, when the external host 110 provides the file content 132 (also referred to as a correction time file) to the peripheral device 120, the purpose of time correction can be achieved and no additional development and maintenance of USB host tools are required.

In another embodiment, when the of the file content 132 is an update command, the command parser 123 may utilize the data of the file content 132 to update a wallpaper image. For example, after the peripheral device 120 is powered on, a first wallpaper image may be displayed on the peripheral device 120. After the wallpaper image in the peripheral device 120 is updated, the peripheral device 120 displays a second wallpaper image. In this case, when the external host 110 writes the data (also referred to as an update-file) of the file content 132 to the peripheral device 120, the wallpaper image of the peripheral device 120 is updated. In this case, the peripheral device 120 retains the data of the file content 132 (i.e., the second wallpaper image).

In other embodiments, the command parser 123 further comprises a storage circuit 122. The storage circuit 122 comprises the boost information 141, a FAT 142, a root directory 143 and data contents D1~D4. In one embodiment, the storage circuit 122 comprises a memory controller 124 and storage space 125. The memory controller 124 stores the boost information 141 from the sector 0 of the storage space 125. Therefore, the sector 0 is also called a boot sector. The peripheral device 120 simulates as a virtual disk according to the file-location data 131, the FAT 142 and the root directory 143. In some embodiments, the memory controller 124 stores the FAT 142 from the sector 6 of the storage space 125, and stores the root directory 143 from the sector 8 of the storage space 5. The FAT 142 is configured to record the storage address, the file size, and the file name of each external data. The root directory 143 records a root directory and its subdirectories. In one embodiment, the empty sectors of the storage space 125 are not continuous so that the memory controller 124 divides the file content 132 into the data contents D1~D4 and stores the data contents D1~D4 in the discontinuous empty sectors from the sector 40.

In some embodiments, the external host 110 first reads the root directory 143 to obtain which directory stores specific data. Then, the external host 110 obtains the actual address of the specific data according to the FAT 142. In this case, the external host 110 analyzes the root directory 143 and the FAT 142 to generate the file-location data 131 and provides the file-location data 131 to the peripheral device 120. The peripheral device 120 analyzes the file content 132 provided by the external host 110 to determine whether the file content 132 comprises an effective instruction. When the file content 132 comprises the effective instruction, the peripheral device 120 provides the specific data to the external host 110. In some embodiments, even if the specific data is stored in the discontinuous sectors, the memory controller 124 uses the file-location data 131 to read the specific data (e.g., D1~D4) from the discontinuous sectors.

Figure 2:
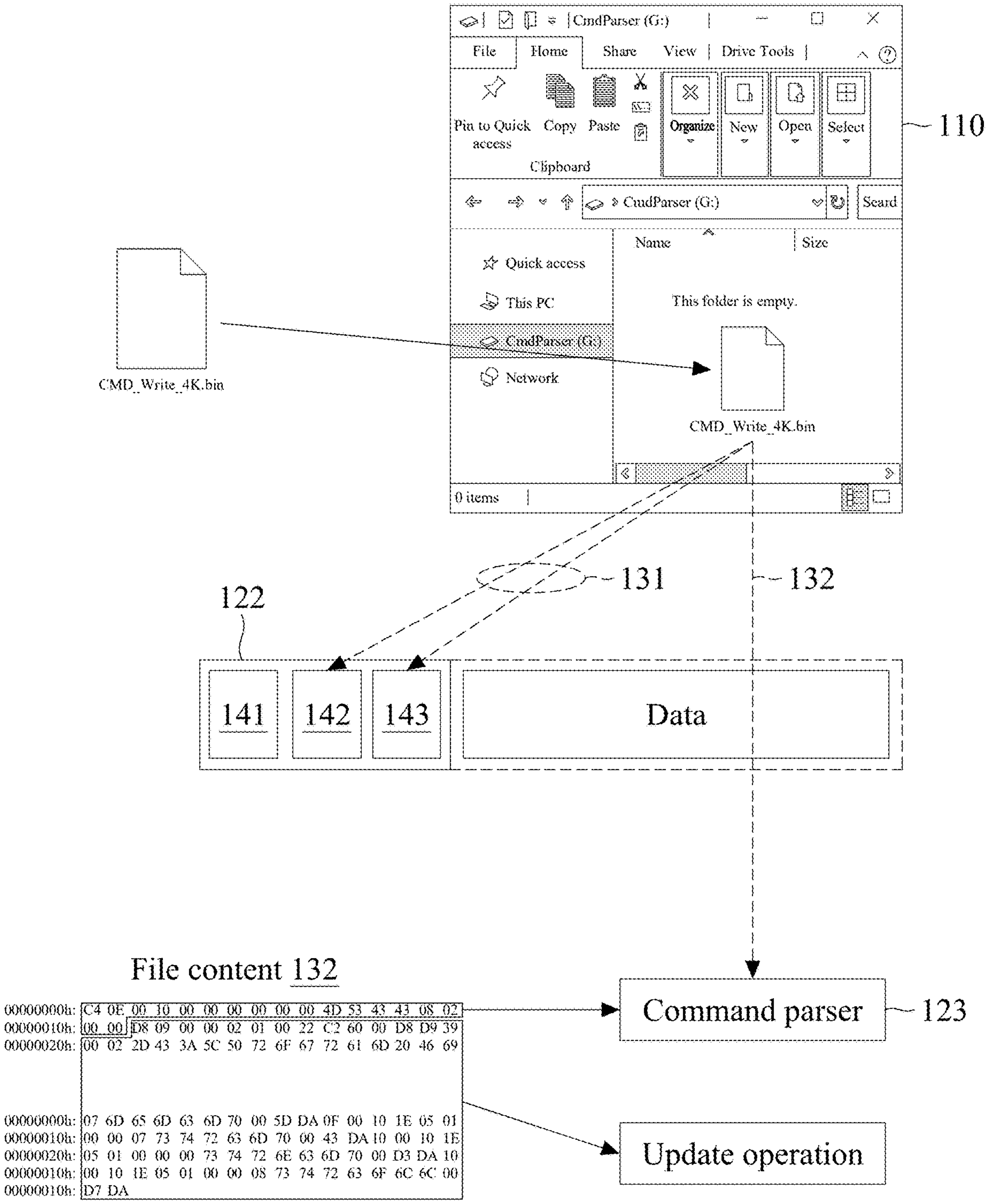
FIG. 2 is a schematic diagram of the operation of the external host transmitting commands to peripheral devices according to various aspects of the present disclosure.

FIG. 2 is a schematic diagram of the operation of the external host 110 transmitting commands to the peripheral device 120 according to various aspects of the present disclosure. For brevity, assume that the external host 110 uses Windows operating system. When the peripheral device 120 is coupled to the external host 110, the external host 110 serves the peripheral device 120 as a disk G. At this time, the disk G is empty. When the user drags a file (e.g., CMD_Write_4K.bin) to the disk G, the external host 110 outputs the file (e.g., CMD_Write_4K.bin) to the peripheral device 120.

The command parser 123 analyzes the file content 132 of the file (e.g., CMD_Write_4K.bin) provided by the external host 110 to determine whether the file content 132 comprises an effective instruction. When the file content 132 comprises an effective instruction, the command parser 123 works according to the file content 132. In one embodiment, the command parser 123 performs an update operation according to the data of the file content 132. For example, the command parser 123 may update the time information or update a wallpaper image. In some embodiments, the peripheral device 120 may replace the specific data (e.g., a wallpaper image) of the storage circuit 122 with the data of the file content 132.

Figure 3A:
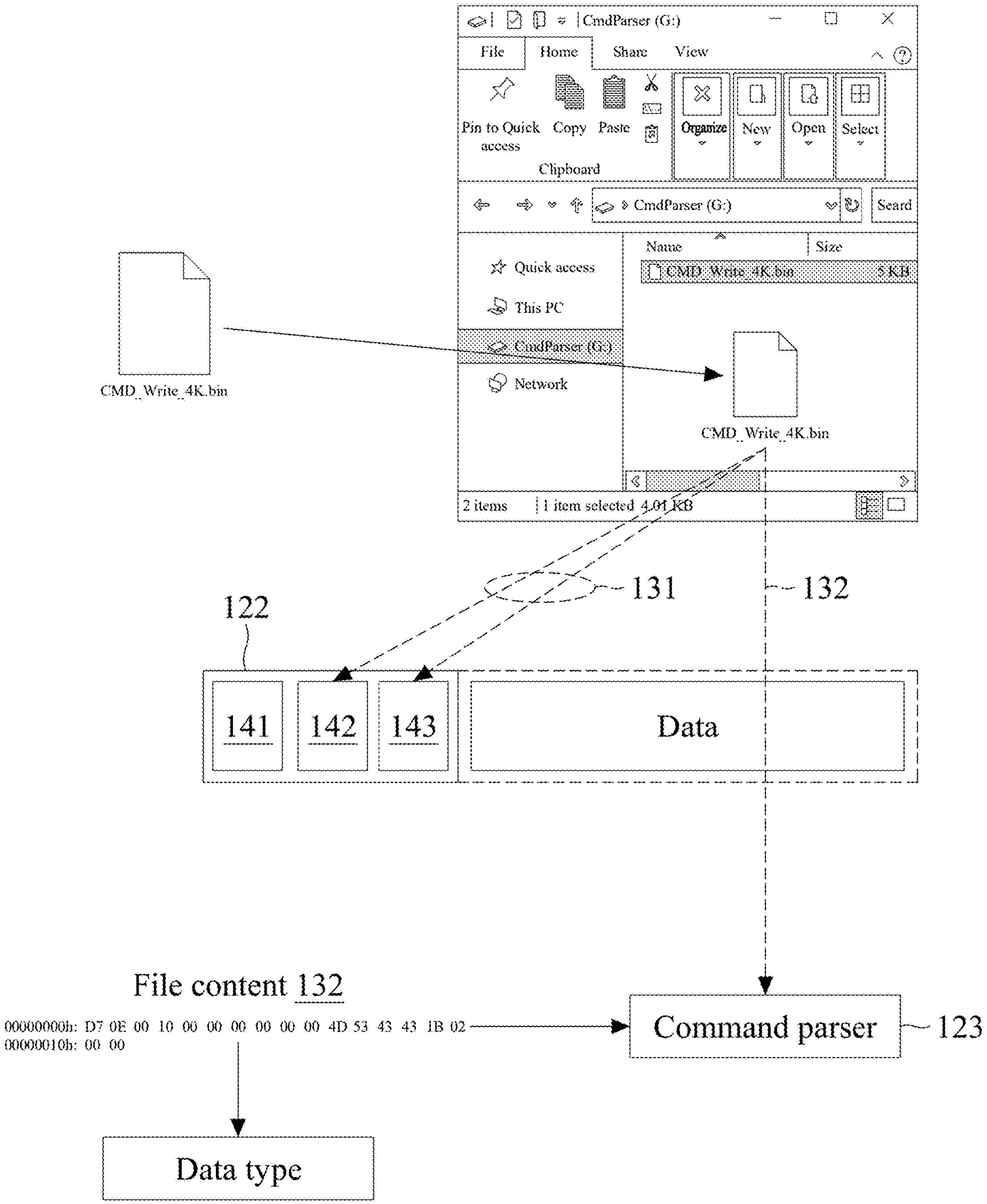
FIG. 3A is a schematic diagram of an exemplary embodiment of the operation of an external host reading a peripheral device.
Figure 3B:
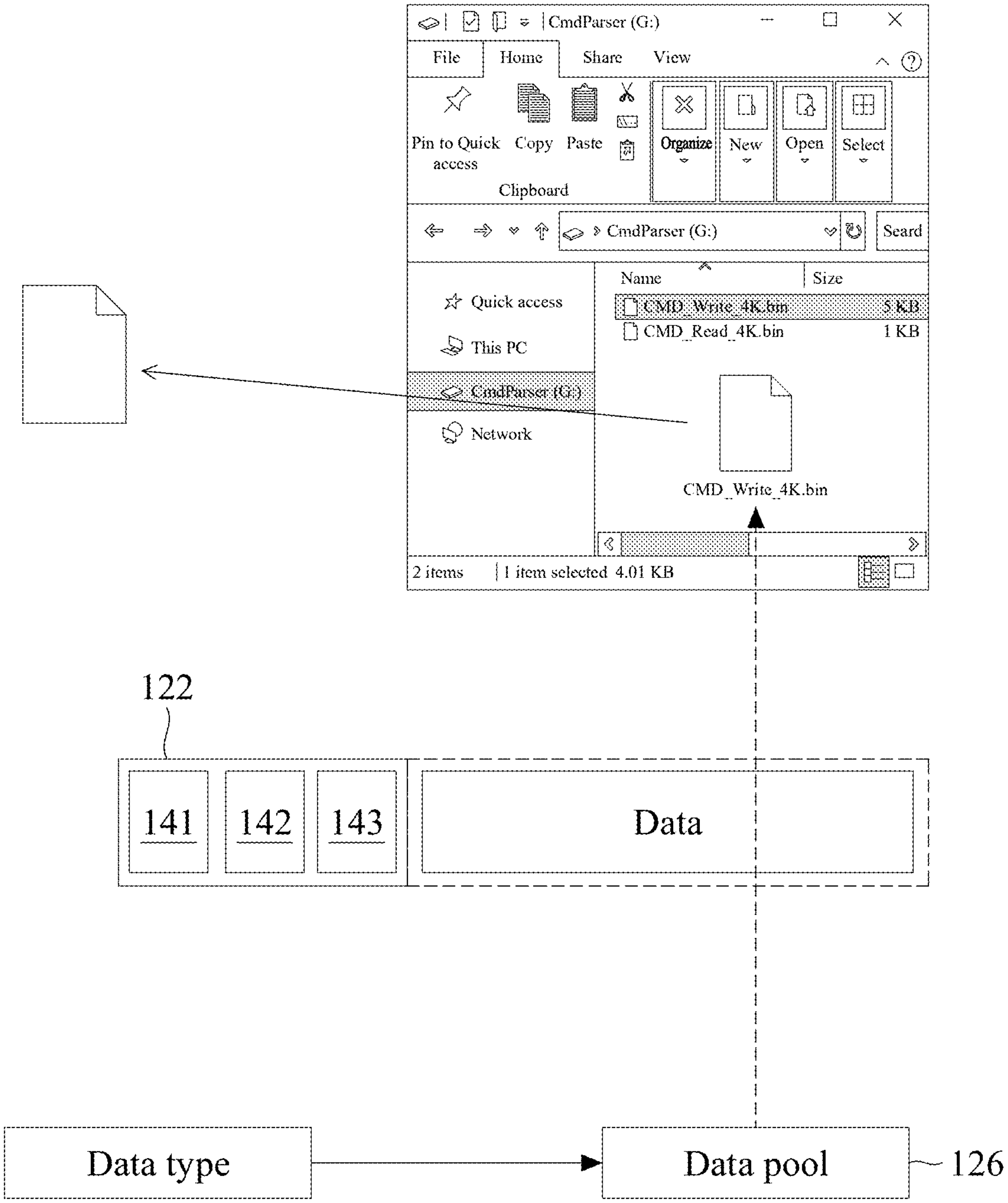
FIG. 3B is a schematic diagram of another exemplary embodiment of the operation of an external host reading a peripheral device.

FIG. 3A is a schematic diagram of an exemplary embodiment of the operation of an external host reading a peripheral device. FIG. 3B is a schematic diagram of another exemplary embodiment of the operation of an external host reading a peripheral device. Refer to FIG. 3A, when the user drags a file data (e.g., CMD_Write_4K.bin) to the disk G, the external host 110 outputs the file-location data 131 and the file content 132 to the peripheral device 120. The command parser 123 analyzes whether the file content 132 provided by the external host 110 comprises an effective instruction. When the file content 132 comprises the effective instruction, the command parser 123 provides the data content required by the external host 110.

In FIG. 3B, the command parser 123 directs a data pool 126 to provide the corresponding data content to the external host 110. The user can use the external host 110 to read the corresponding file from the disk G (i.e., the peripheral device 120). In other embodiments, the command parser 123 directs the storage circuit 122 to provide specific information (also referred to as read data) and utilizes the USB interface 121 to output the read data to the external host 110.

In some embodiments, the external host 110 outputs the file content 132 to select specific data to be read and then reads the corresponding file to obtain the data content. The storage circuit 122 outputs the specific data to the external host 110. In one embodiment, the user obtains the internal settings of the peripheral device 120 according to the specific data received by the external host 110. The user knows whether an abnormality occurs in the peripheral device 120 and the cause of the abnormality according to the internal settings.

The structure of storage circuit 122 is not limited in the present disclosure. In one embodiment, the storage circuit 122 comprises a volatile memory (not shown) to store the FAT 142 and the root directory 143. The kind of volatile memory is not limited in the present disclosure. In one embodiment, the FAT 142 and the root directory 143 are stored in a static random-access memory (SRAM). In another embodiment, the storage circuit 122 further comprises a non-volatile memory (not shown). In this case, the non-volatile memory is configured to store update data, such as a wallpaper image.

Figure 4:
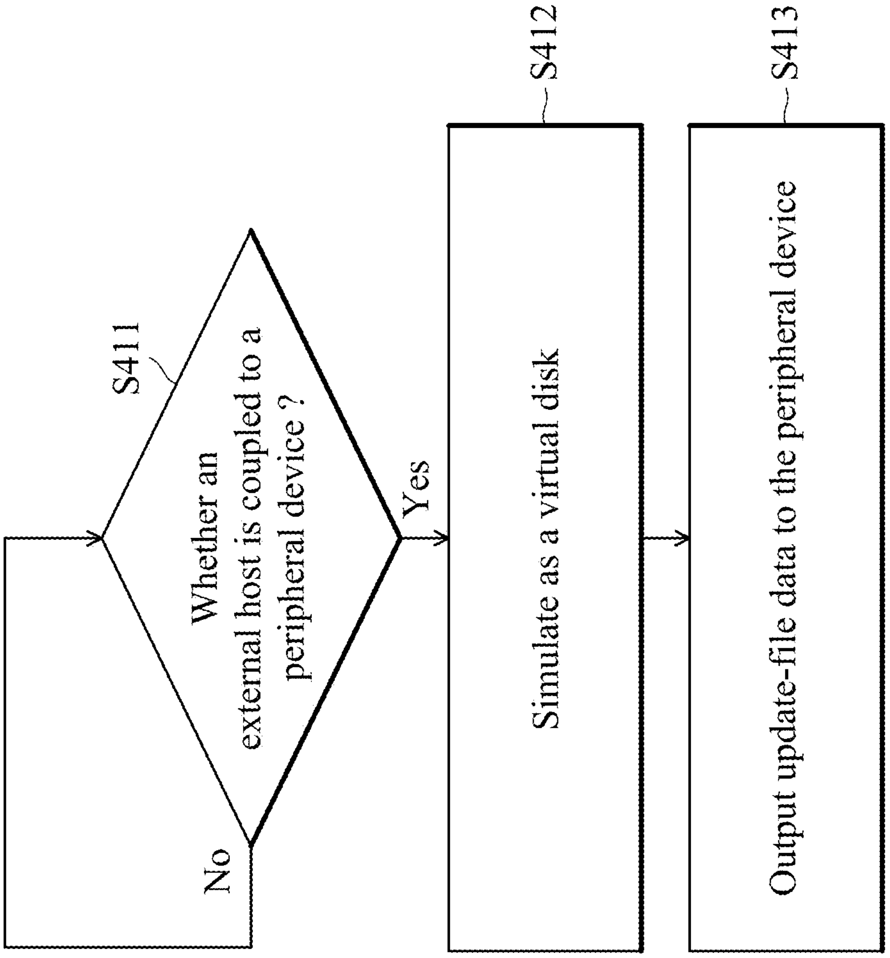
FIG. 4 is a flowchart of an exemplary embodiment of a data transmission method according to various aspects of the present disclosure.

FIG. 4 is a flowchart of an exemplary embodiment of a data transmission method according to various aspects of the present disclosure. Data transmission methods may take the form of a program code. When the program code is loaded into and executed by a machine, the machine thereby becomes a control system for practicing the methods. First, a determination is made as to whether an external host is coupled to a peripheral device (step S411). In one embodiment, the peripheral device comprises a USB interface to connect the external host.

When the external host is not coupled to a peripheral device, step S411 is performed to determine whether the external host is coupled to a peripheral device. When the external host is coupled to a peripheral device, the peripheral device simulates as a virtual disk (step S412). Next, the external host outputs update-file data to the peripheral device to update the specific information of the peripheral device (step S413). In some embodiments, the update-file data comprises file-location data and data content (also referred to as file content). The data content comprises a self-defining command and update data. In one embodiment, the peripheral device analyzes the file content provided by the external host to determine whether the file content comprises an effective instruction. When the file content comprises an effective instruction, the peripheral device utilizes the update data to correct time-information. In another embodiment, the peripheral device utilizes the update data to update specific data, such as a wallpaper image. In this case, the peripheral device stores the update data.

In other embodiments, when the external host wants to read the data of the peripheral device, the external host sends file data to the peripheral device. In this case, after receiving the file data, the peripheral device determines whether the file content of the file data comprises an effective instruction. When the file content of the file data comprises an effective instruction, the peripheral device retrieves the corresponding data and provides the retrieved data to the external host. The external host determines whether the peripheral device is operating normally or whether the settings of the peripheral device are correct according to the retrieved data provided by the peripheral device.

It will be understood that when an element or layer is referred to as being "coupled to" another element or layer, it can be directly coupled to the other element or layer or intervening elements or layers may be present. In contrast, when an element or layer is referred to as be "directly coupled to" another element or layer, there are no intervening elements or layers present.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an external host and a peripheral device for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an external host and a peripheral device for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another. In the following claims, the terms "first," "second," etc. are used merely as labels, and are not intended to impose numerical requirements on their objects.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A peripheral device comprising:

a universal serial bus (USB) interface configured to be coupled to an external host and to receive file data from the external host, wherein the file data comprises file-location data and file content, and the file content comprises a self-defining command and update data;

a storage circuit configured to store a file allocation table and a root directory; and a command parser analyzing the self-defining command to generate an analysis result and operating according to the analysis result, wherein:

in response to the self-defining command being a first update command, the command parser performs an update operation, the external host generates the file data according to the characteristics of the file allocation table, the peripheral device simulates as a virtual disk according to the file-location data, the file allocation table and the root directory.

2. The peripheral device as claimed in claim 1, further comprising:

a real time clock (RTC) configured to provide time information.

3. The peripheral device as claimed in claim 2, wherein in response to the self-defining command being the first update command, the command parser updates the time information according to the update data.

4. The peripheral device as claimed in claim 1, wherein the storage circuit comprises:

a volatile memory configured to store the file allocation table and the root directory.

5. The peripheral device as claimed in claim 4, wherein the storage circuit further comprises:

a non-volatile memory configured to store the update data.

6. The peripheral device as claimed in claim 5, wherein the storage circuit further comprises:

a memory controller reading the file allocation table and the root directory according to address data of the file data to write the update data in a specific address of the non-volatile memory.

7. The peripheral device as claimed in claim 6, wherein the command parser accesses the storage circuit to obtain read data and outputs the read data to the external host via the USB interface.

8. A data transmission method comprising:

determining whether a peripheral device is coupled to an external host;

simulating the peripheral device as a virtual disk according to file-location data, a file allocation table and a root directory in response to the peripheral device being coupled to the external host; and outputting update-file data to the peripheral device to update specific information of the peripheral device, wherein:

the update-file data comprises the file-location data and data content, the data content comprises a self-defining command and update data, the file-location data and the root directory are stored in the peripheral device, the peripheral device simulates as a virtual disk according to the file-location data, the file allocation table and the root directory.

9. The data transmission method as claimed in claim 8, wherein time information of the peripheral device is corrected by the update data.

10. The data transmission method as claimed in claim 8, further comprising:

storing the update data in the peripheral device.

11. The data transmission method as claimed in claim 8, further comprising:

utilizing a USB interface to send file data to the peripheral device; and utilizing the USB interface to receive a return file provided by the peripheral device.

12. A control system comprising:

an external host generating first file data according to characteristics of a file allocation table and comprising:

a first USB interface configured to output first file data; and a peripheral device comprising:

a second USB interface configured to receive the first file data which comprises file-location data and file content comprising a self-defining command and update data;

a storage circuit configured to store the file allocation table and a root directory; and a command parser analyzing the self-defining command to generate an analysis result and operating according to the analysis result, wherein:

in response to the self-defining command being a first update command, the command parser performs an update operation, the peripheral device simulates as a virtual disk according to the file-location data, the file allocation table and the root directory.

13. The control system as claimed in claim 12, wherein in response to the second USB interface being coupled to the first USB interface, the peripheral device simulates as a virtual disk.

14. The control system as claimed in claim 13, wherein:

the first USB interface further outputs second file data, the second USB interface receives the second file data which comprises file content, and the command parser analyzes whether the file content comprises an effective instruction.

15. The control system as claimed in claim 14, wherein in response to the file content comprising an effective instruction, the command parser accesses the storage circuit to obtain read data and utilizes the second USB interface to output the read data to the first USB interface.

16. The control system as claimed in claim 15, wherein the external host determines whether the operation of the peripheral device is normal according to the read data.

17. The control system as claimed in claim 15, wherein the external host determines whether the settings of the peripheral device are correct according to the read data.

18. The control system as claimed in claim 12, wherein:

in response to the self-defining command being a second update command, the command parser utilizes the update data to update a wallpaper image, the wallpaper image is displayed on the peripheral device.

19. The control system as claimed in claim 12, wherein:

the storage circuit outputs specific data to the external host, the external host obtains internal settings of the peripheral device according to the specific data and knows whether an abnormality occurs in the peripheral device and the cause of the abnormality according to the internal settings.

* * * * *